(12) United States Patent
Kini et al.

(10) Patent No.: US 9,094,340 B2
(45) Date of Patent: *Jul. 28, 2015

(54) LDP IGP SYNCHRONIZATION FOR BROADCAST NETWORKS

(71) Applicant: Telefonaktiebolaget L M Ericsson (publ), Stockholm (SE)

(72) Inventors: Sriganesh Kini, Fremont, CA (US); Wenhu Lu, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/171,332

(22) Filed: Feb. 3, 2014

(65) Prior Publication Data

US 2014/0146828 A1 May 29, 2014

Related U.S. Application Data

(63) Continuation of application No. 13/356,517, filed on Jan. 23, 2012, now Pat. No. 8,681,823, which is a continuation of application No. 12/421,443, filed on Apr. 9, 2009, now Pat. No. 8,102,883.

(60) Provisional application No. 61/157,501, filed on Mar. 4, 2009.

(51) Int. Cl.
*H04L 12/26* (2006.01)
*H04L 12/723* (2013.01)
*H04L 12/751* (2013.01)
(Continued)

(52) U.S. Cl.
CPC ............ *H04L 45/507* (2013.01); *H04J 3/0635* (2013.01); *H04L 45/02* (2013.01); *H04L 45/023* (2013.01); *H04L 45/16* (2013.01);
(Continued)

(58) Field of Classification Search
CPC .............................. H04L 45/02; H04L 45/507
USPC ................................................... 370/401, 503
See application file for complete search history.

(56) References Cited

U.S. PATENT DOCUMENTS 6,778,531 B1 8/2004 Kodialam et al.
7,042,850 B2 5/2006 Stewart
(Continued)

FOREIGN PATENT DOCUMENTS

| RU | 2004127857 | 2/2006 |
|---|---|---|
| WO | WO-2006/065440 | 6/2006 |
| WO | WO-2009/088881 | 7/2009 |

OTHER PUBLICATIONS

International Search Report and Written Opinion, Application No. PCT/US2010/023947, dated Apr. 16, 2010, 9 pages.
(Continued)

*Primary Examiner* — Edan Orgad
*Assistant Examiner* — Emmanuel Maglo
(74) *Attorney, Agent, or Firm* — Nicholson De Vos Webster & Elliott, LLP (57) ABSTRACT

A network element that has a broadcast interface to a broadcast network becoming operational determines whether at least one alternate path exists to the broadcast network. The broadcast interface is to carry traffic on a label switched path. If an alternate path exists, the broadcast interface will not be advertised to the broadcast network until label distribution protocol (LDP) is operational with all neighbors on the broadcast interface.

20 Claims, 7 Drawing Sheets

(51) Int. Cl.
*H04L 12/757* (2013.01)
*H04L 12/761* (2013.01)
*H04L 12/707* (2013.01)
*H04J 3/06* (2006.01)
*H04L 12/703* (2013.01)

(52) U.S. Cl.
CPC ............... *H04L 45/22* (2013.01); *H04L 45/28* (2013.01); *H04L 45/50* (2013.01)

(56) References Cited

U.S. PATENT DOCUMENTS

| | | | |
|---|---|---|---|
| 7,437,476 | B2 | 10/2008 | Zinin et al. |
| 7,551,551 | B2 | 6/2009 | Filsfils et al. |
| 7,551,599 | B2 | 6/2009 | Levit et al. |
| 7,715,307 | B2 * | 5/2010 | Walton et al. ............... 370/216 |
| 7,719,960 | B2 | 5/2010 | Atlas et al. |
| 8,270,395 | B2 | 9/2012 | Kompella |
| 2002/0078232 | A1 | 6/2002 | Simpson et al. |
| 2003/0185217 | A1 | 10/2003 | Ganti et al. |
| 2004/0202171 | A1 | 10/2004 | Hama |
| 2005/0068913 | A1 | 3/2005 | Tan et al. |
| 2005/0088965 | A1 | 4/2005 | Atlas et al. |
| 2006/0126495 | A1 * | 6/2006 | Guichard et al. ............ 370/216 |
| 2006/0126496 | A1 | 6/2006 | Filsfils et al. |
| 2006/0256712 | A1 * | 11/2006 | Imajuku et al. .............. 370/218 |
| 2007/0019647 | A1 | 1/2007 | Roy et al. |
| 2007/0165515 | A1 | 7/2007 | Vasseur |
| 2007/0180104 | A1 | 8/2007 | Filsfils et al. |
| 2007/0245034 | A1 | 10/2007 | Retana et al. |
| 2007/0268821 | A1 | 11/2007 | Levit et al. |
| 2008/0101418 | A1 | 5/2008 | Vasseur |
| 2008/0320166 | A1 | 12/2008 | Filsfils et al. |
| 2009/0201803 | A1 * | 8/2009 | Filsfils et al. ................ 370/222 |
| 2009/0245259 | A1 | 10/2009 | Filsfils et al. |

OTHER PUBLICATIONS

International Search Report and Written Opinion, Application No. PCT/IB2010/053807, dated Dec. 10, 2010, 14 pages.

Non-Final Office Action, U.S. Appl. No. 12/421,443, dated Dec. 14, 2010, 22 pages.

Notice of Allowance, U.S. Appl. No. 12/421,443, dated May 18, 2011, 10 pages.

Notice of Allowance, U.S. Appl. No. 12/421,443, dated Sep. 16, 2011, 11 pages.

Notice of Allowance, U.S. Appl. No. 12/546,433, dated Mar. 1, 2013, 17 pages.

Non-Final Office Action, U.S. Appl. No. 13/356,517, dated Sep. 12, 2013, 45 pages.

Notice of Allowance, U.S. Appl. No. 13/356,517, dated Nov. 6, 2013, 13 pages.

"MPLS LDP-IGP Synchronization", Cisco Systems, Nov. 20, 2004, 32 pages.

Andersson, L., et al., "LDP Specification," Network Working Group, *Request for Comments: 5036*, Oct. 2007, 135 pages.

Asati, Rajiv, et al., "LDP End-of-LIB draft-ietf-mpls-ldp-end-of-lib-03.txt," MPLS Working Group, *Internet Draft*, Jan. 14, 2009, 10 pages.

Ayyangar, V., et al., "LDP OSPF Synchronization and VPN Traffic Blackholing," Network Working Group, *Internet Draft*, Jan. 2007, 11 pages.

Chen, Emily, "Explicit Notification for LDP-IGP Synchronization," Network Working Group, *Internet Draft*, Jun. 2007, 11 pages.

Jork, M., et al., "LDP IGP Synchronization," Network Working Group, *Request for Comments: 5443*, Mar. 2009, 7 pages.

Lu, W., et al., "LDP IGP Synchronization for broadcast networks, draft-lu-ldp-igp-sync-bcast-00.txt," Network Working Group, *Internet Draft*, IETF, Redback Networks (An Ericsson Company), Mar. 4, 2009, 7 pages.

McPherson, D., "Intermediate System to Intermediate System (IS-IS) Transient Blackhole Avoidance," Network Working Group, *RFC 3277*, Apr. 2002, 7 pages.

Morin, T., et al., "Mulitcast Blackhole Mitigation with PIM Adjacency Conditions on Routing Announcements," Network Working Group, *Internet Draft*, Feb. 25, 2008, 12 pages.

Moy, J., "OSPF Version 2," Network Working Group, *Request for Comments: 2328*, Apr. 1998, 244 pages.

\* cited by examiner

LOCAL IGP INTERFACE STRUCTURE 228

| INTERFACE 510 | CUT-EDGE 515 | SUPPRESS LINK FLAG 520 |
|---|---|---|
| 132 | NO | SET |

FIG. 5A

LINK STATE DATABASE 224

| FROM 530 | TO 540 | LINK 550 |
|---|---|---|
| 130 | 120 | 132 |
| 130 | 160 | 134 |
| 140 | 120 | 142 |
| 140 | 155 | 144 |
| 145 | 120 | 146 |
| 145 | 170 | 148 |
| 150 | 120 | 152 |
| 150 | 165 | 154 |
| 110 | 120 | 114 |
| 110 | 105 | 112 |
| 110 | 165 | 116 |
| 120 | 110 | 122 |
| 120 | 130 | 124 |
| 120 | 140 | 126 |
| 120 | 145 | 129 |
| 120 | 150 | 128 |

LDP IGP SYNCHRONIZATION FOR BROADCAST NETWORKS

CROSS-REFERENCE TO RELATED APPLICATIONS

This application is a continuation of U.S. application Ser. No. 13/356,517, filed Jan. 23, 2012, which is a continuation of U.S. application Ser. No. 12/421,443, filed Apr. 9, 2009, which claims the benefit of U.S. Provisional Application No. 61/157,501, filed Mar. 4, 2009, which are hereby incorporated by reference.

TECHNICAL FIELD

Embodiments of the invention relate to the field of networking; and more specifically to LDP (Label Distribution Protocol) IGP (Interior Gateway Protocol) synchronization for broadcast networks.

BACKGROUND

LDP (described in "LDP Specification", RFC 5036, October 2007), which is used to establish LSPs (label switched paths) to destinations, typically relies on IGP (e.g., Open Shortest Path First (OSPF) (defined in "OSPF Version 2", STD 54, RFC 2328, April 1998), Intermediate system to Intermediate system (IS-IS) (defined in "Intermediate system to intermediate system intra-domain-routing routine information exchange protocol for use in conjunction with the protocol for providing the connectionless-mode Network Service (ISO 8473)" ISO standard 10589, 1992), etc.) to provide the underlying routing information (e.g., the cost metric between the hops in the network). Even though LDP typically relies on the IGP protocol, they are independent from each other. IGP may be operational on a link prior to LDP becoming operational on that link which can lead to packet loss.

The request for comments (RFC) 5443, "LDP IGP Synchronization", March 2009 (hereinafter "LDP IGP Synchronization") describes a mechanism to discourage links from being used for IP forwarding if LDP is not fully operational on that link. RFC 5443 describes that when LDP is not fully operational on a given link (e.g., all the label bindings have not yet been exchanged), IGP will advertise the link with maximum cost to discourage traffic from being sent over the link. When LDP on the link becomes operational (e.g., all label bindings have been exchanged), IGP advertises the link with the correct cost.

On broadcast links (more than one LDP/IGP peer on the same link), IGP advertises a common cost to the broadcast link, rather than a separate cost to each peer. A broadcast pseudo-node may be implemented in a network to reduce the number of links in the shortest path first (SPF) (e.g., open shortest path first (OSPF), constrained shortest path first (CSPF)) database of each network element. Each network element forms adjacencies with the broadcast pseudo-node and advertises a link and cost to the broadcast pseudo-node and the broadcast pseudo-node advertises a link and cost to each network element.

For broadcast links, the RFC 5443 "LDP IGP Synchronization" describes that the mechanism can be applied to the link as a whole and not an individual peer. Advertising maximum cost to the link as a whole may cause sub-optimal traffic diversion and/or black-holing of traffic (e.g., VPN traffic).

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a network element, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, computer end stations, etc.). Some network elements are "multiple services network elements" that provide support for multiple networking functions (e.g., routing, bridging, switching, Layer 2 aggregation, and/or subscriber management), and/or provide support for multiple application services (e.g., data, voice, and video).

Within certain network elements, multiple "interfaces" may be configured. As used herein an interface is a connection between a network element and one of its attached networks. An interface has information associated with it that is typically obtained from underlying lower level protocols and the routing protocol (e.g., an IP address and mask). An interface is sometimes referred to as a link. A broadcast interface is an interface that is connected with a broadcast network.

A method and apparatus for LDP-IGP synchronization for broadcast networks is described. In one embodiment of the invention, when a link to a broadcast network comes up, the network element whose link is coming up will postpone advertising the link to the broadcast network until LDP is operational with all neighbors on that broadcast link (all broadcast neighbors). For example, that network element determines whether that link is the only path to the broadcast network. If that link is the only path to the broadcast network, the interface corresponding to that link is marked as a cut-edge interface. When the network element is ready to update its link-state advertisement (LSA) with the link to the broadcast network, it will postpone adding that link to its LSA if the corresponding interface is not a cut-edge interface and LDP is not operational with all neighbors on that interface. After LDP becomes operational with all neighbors on that interface (e.g., LDP becomes synchronized with IGP), the link will be added to the LSA and will be transmitted to the broadcast network.

As used herein, the term "link state advertisements" and "LSA" is protocol agnostic. For example, if the IGP protocol is Open Shortest Path First (OSPF), then the link state advertisement may be a Router-LSA. If the IGP protocol is intermediate system to intermediate system (IS-IS), then the link state advertisement may be a Link State PDU.

In one embodiment, if the IGP protocol is Open Shortest Path First (OSPF), the Router-LSA is not updated with a Link Type 2 (link to transit network) for the subnet until LDP is operational with all network elements on that subnet.

In one embodiment, if the IGP protocol is intermediate system to intermediate system (IS-IS), the Link State PDU is not updated with an IS Reachability TLV (or an Extended IS Reachability TLV) to the broadcast network until LDP is operational with all network elements.

Figure 1:
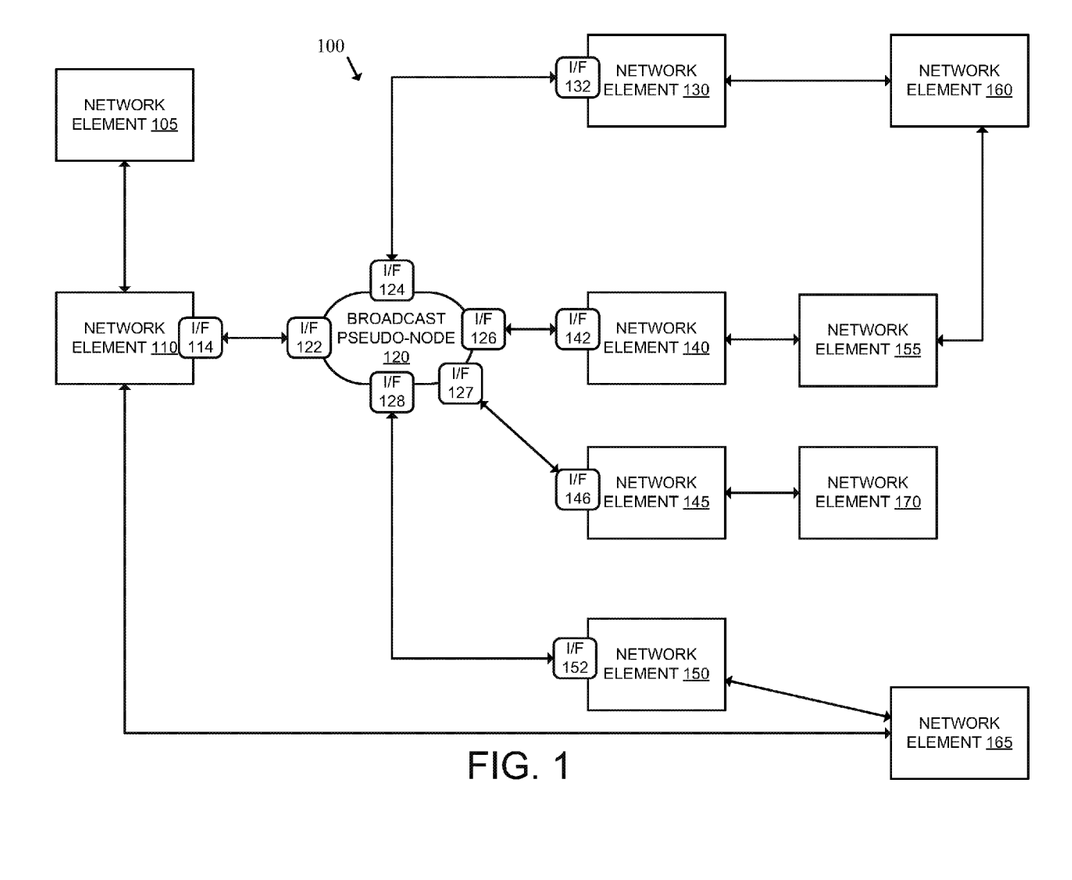
FIG. 1 illustrates an exemplary broadcast network according to one embodiment of the invention.

FIG. 1 illustrates an exemplary broadcast network according to one embodiment of the invention. The network 100 includes the network elements 105, 110, 130, 140, 145, 150, 155, 160, 165, and 170, and the broadcast pseudo-node 120. The network elements 110, 130, 140, 145, and 150 are each directly coupled with the broadcast pseudo-node 120. It should be understood that the topology of the network 100 is exemplary, and other topologies may be used in embodiments of the invention. For example, in some embodiments, a broadcast pseudo-node is not used.

In one embodiment, the network elements 105, 160, 165, and 170 are provider edge network elements and the network 100 is a Multiprotocol Label Switching (MPLS) network with Virtual Private Network (VPN) applications. As one example, the network element 105 may have a LDP LSP path to the network elements 160, 155, 170, and/or 165. It should be understood that other LDP LSP paths may be established in the network 100.

The network elements 110, 130, 140, 145, and 150 each advertise their corresponding interface's cost to the broadcast pseudo-node 120. For purposes of explanation, the network element 110 will advertise a cost of 1 on the broadcast interface 114, the network element 130 will advertise a cost of 1 on the broadcast interface 132, the network element 140 will advertise a cost of 1 on the broadcast interface 142, the network element 145 will advertise a cost of 1 on the broadcast interface 146, and the network element will advertise 152 will advertise a cost of 1 on the broadcast interface 152. In addition, exemplary purposes, each other link in the network 100 has a cost of 1 with the exception of the link between the network element 110 and the network element 165 which has a cost of 10. The broadcast pseudo-node 120 also advertises its interfaces to its neighbors (e.g., through the interfaces 122, 124, 126, and 127) with a cost of zero. It should be understood that the interfaces illustrated in FIG. 1 are exemplary and other interfaces are not illustrated in order not to confuse understanding of the invention.

In one interpretation of the RFC 5443 "LDP IGP Synchronization" as applied to broadcast networks, when a new network element is discovered on the broadcast network, all the network elements with direct links to the broadcast network advertise maximum cost to the broadcast network. For example, with reference to FIG. 1, if the broadcast interface 132 of the network element 130 becomes operational (e.g., the network element 130 was added to the network while the network elements 110, 140, 145, and 150 are each already connected with the broadcast pseudo-node 120) and detected by the network elements 110, 140, 145, 150, those network elements each start advertising maximum cost to the broadcast network (the network elements 110, 132, 140, 145, and 150 advertise maximum cost on the broadcast interfaces 114, 132, 142, 146, and 152 respectively). Since maximum cost is greater than the cost of 10, traffic between the network element 105 and the network element 165 will be diverted to the sub-optimal path of network element 105 to the network element 110 to the network element 165 (instead of the optimal path of network element 105 to network element 110 to the network element 150 to the network element 165). Thus, using the interpretation of the RFC "LDP IGP Synchronization" that has each network element advertising a maximum cost to the broadcast network may result in sub-optimal traffic diversion.

In addition, as a result of applying the mechanism described in the RFC 5443 "LDP IGP Synchronization" for broadcast networks, traffic may be black-holed (continually dropped) at a network element due to each broadcast network element advertising a maximum cost. For example, using the network topology of FIG. 1 and the same costs of the links in the previous example, the network element 105 transmits VPN traffic to the network element 160 prior to the interface 132 becoming operational on the network element 130 and the LDP LSP carrying that VPN traffic will take the following path: network element 105 to the network element 110 to the network element 140 to the network element 155 to the network element 160 (this is the only path possible in the topology). After the interface 132 becomes operational, it should be understood that an additional possible LDP LSP from the network element 105 to the network element 160 will exist once LDP peering has been established along that path (network element 105 to the network element 110 to the network element 130 to the network element 160). Once established, this LDP LSP will be favored over the previous LSP because it will have a lower cost (3 versus 4 in the example). However, since each link of the broadcast network will be advertised as a maximum cost, the path through the network element 130 will have a lower cost than the path through the network elements 140 and 155. As a result, the network element 110 will switch its nexthop to the network element 160 from the network element 140 to the network element 130 before an LDP LSP has been established through the network element 130. Consequently, the network element 110 will try, and fail, to transmit VPN traffic to the network element 160 through the network element 130 until that LDP LSP has been established (e.g., the network element 110 will not have the proper labels to process the VPN traffic). Thus, the VPN traffic will be black-holed at the network element 110. The amount of traffic loss in this case is at least the order of the time it takes for the LDP LSP to become operational. Although the topology in FIG. 1 is rather simple, it should be understood that in some topologies this can be of the order of several minutes (which can violate carrier class reliability metrics).

In another interpretation of the RFC 5443 "LDP IGP Synchronization" as applied to broadcast networks, when a new network element is discovered on the broadcast network, only that network element transmits a maximum cost to the broadcast network and the other network elements transmit their normal cost. However, this interpretation also suffers from the possibility of black-holing traffic. It should be understood that although the network element 130 advertises a maximum cost to the broadcast network, this only affects traffic being transmitted by the network element 130 and it will not affect traffic being received by the network element 130. Thus, from the point of view of the network element 110, the link between the network element 110 and the network element 130 will have a cost of 1. Using the same example as above and since IGP will converge faster than LDP, the network element 110 will try, and fail, to transmit VPN traffic to the network element through the network element 130 until that LDP LSP has been established. Thus, similar to the above example, the VPN traffic will be black-holed at the network element 110.

In contrast, as will be described later herein, embodiments of the invention allow for LDP-IGP synchronization in broadcast networks without sub-optimally diverting traffic or black-holing traffic.

Figure 2:
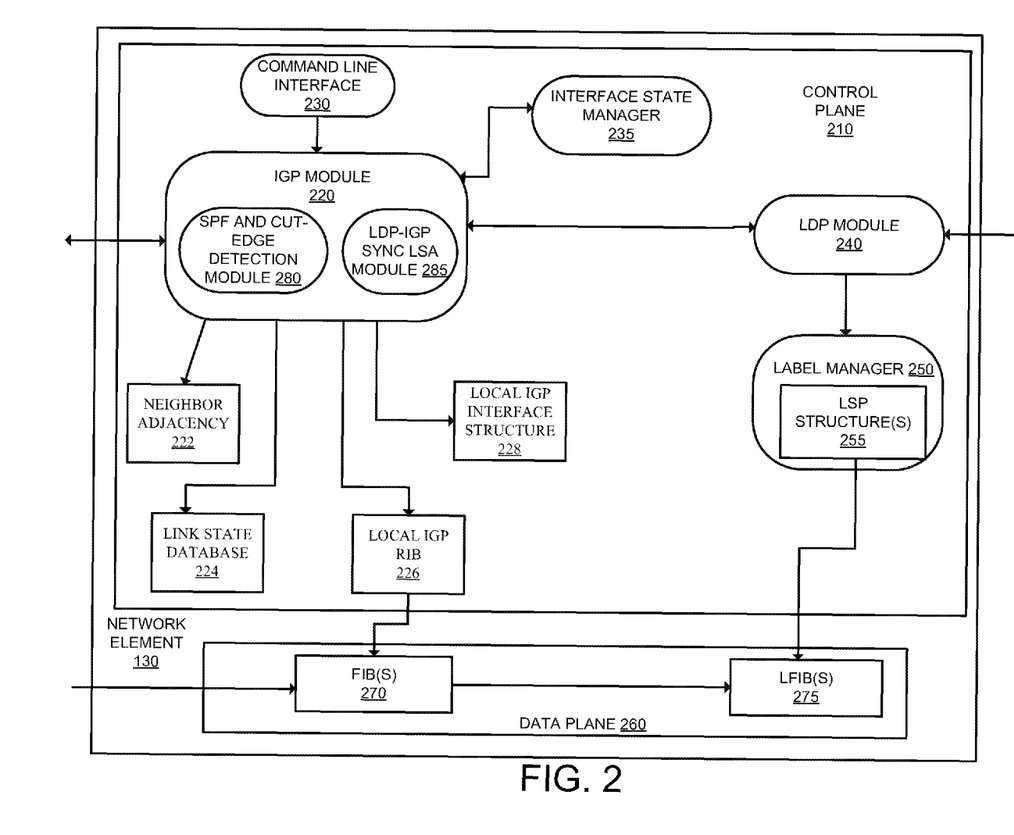
FIG. 2 is a block diagram of an exemplary network element configured for LDP-IGP synchronization for broadcast networks according to one embodiment of the invention.

FIG. 2 is a block diagram of an exemplary network element configured for LDP-IGP synchronization for broadcast networks according to one embodiment of the invention. While FIG. 2 illustrates the network element 130, it should be understood that one or more of the network elements in the network 100 may include similar features. As illustrated in FIG. 2, the network element 130 includes the control plane 210 coupled with the data plane 260. The control plane 210 includes the command line interface 230, the IGP module 220, the interface state manager 235, the LDP module 240, and the label manager 250. The IGP module 200 includes the SPF and cut-edge detection module 280 and the LDP-IGP synchronization LSA module 285. The IGP module 220 manages the neighbor adjacency table 222, the link state database 224, the local IGP RIB (routing information base) 226, and the local IGP interface structure 228.

The IGP module 220 may receive LDP-IGP synchronization for broadcast networks configuration parameters from the command line interface 230. For example, a network administrator may use the command line interface 230 to configure the LDP-IGP synchronization for broadcast networks on the network element 130 (e.g., whether the LDP-IGP synchronization for broadcast networks is enabled, one or more interfaces to monitor for LDP-IGP synchronization for broadcast networks, etc.). In another embodiment, the LDP-IGP synchronization for broadcast networks mechanism is installed for each broadcast interface on the network element 130.

The interface state manager 235 manages the interfaces of the network element 130, including the interfaces 132 and 134. For example, the interface state manager 235 detects when an interface is operational. The interface state manager 235 is coupled with the IGP module 220. The IGP module 220 registers those broadcast interfaces (e.g., the interfaces as specified during configuration) with the interface state manager 235. The interface state manager 235 notifies the IGP module 220 upon a state change of one of those registered interfaces (e.g., a broadcast interface becoming operational, a broadcast interface going down, etc.). The IGP module 220 may then update the local IGP interface structure 228 with those interfaces.

The IGP module 220 establishes and maintains neighbor adjacencies with other network elements in the network 100. For example, the IGP module 220 transmits and receives hello packets from other network elements in the network 100. From these hello packets, the IGP module creates and maintains the neighbor adjacency table 222.

The IGP module 220 also transmits and receives link-state information (typically in the form of link-state advertisements (LSAs)) to construct a topology of the network 100. From the LSAs it receives and transmits, the IGP module 220 creates and maintains the link state database 224 (thus the link state database 224 is a representation of the network topology of the network 100). FIG. 5B illustrates an exemplary link state database 224 according to one embodiment of the invention. As illustrated in FIG. 5B, the link state database 224 includes a From field 530, a To field 540, and a Link field 550.

The IGP module 220 also includes the SPF and cut-edge detection module 280 to determine the optimum paths to the destinations of the link state database 224 (thus, the SPF algorithm is applied to the information of the link state database 224). The resulting routes are added to the local IGP RIB 226, which are then programmed to one or more FIBs (forwarding information bases) on the data plane 260. For example, the routes in the IGP RIB 226 are programmed to one or more packet processing units of one or more line cards in the network element 130.

In addition to determining the optimum paths to the destinations in the link state database 224, the SPF and cut-edge detection module 280 determines whether interfaces are broadcast cut-edge interfaces. A broadcast cut-edge interface is an interface to the broadcast network that represents the only path to that broadcast network. In other words, besides connecting to the broadcast network through the broadcast interface, if an alternate path to the broadcast network does not exist, that broadcast interface is a cut-edge interface. For example, with reference to FIG. 1, the interface 132 is not a cut-edge interface because an alternate IGP path exists to the broadcast pseudo-node 120 (network element 130 to the network element 160 to the network element 155 to the network element 140 to the broadcast pseudo-node 120). The interface 146 is a cut-edge interface because an alternate IGP path does not exist to the broadcast pseudo-node 120. If an interface is a cut-edge interface, a cut-edge property is set for that interface in the local IGP interface structure 228.

In one embodiment of the invention, the SPF and cut-edge detection module 280 makes the determination of a broadcast cut-edge interface by augmenting the step of SPF calculation that adds a network prefix to the local IGP RIB 226 to include an additional check whether that prefix belongs to an interface that is down (e.g., if the prefix matches a down interface, the prefix will be viable from somewhere else and the interface will not be a cut-edge) or is a stub network through which traffic cannot be further transited beyond. Of course, other methods may be used to determine whether alternate paths to the broadcast network exist.

As previously described, the IGP module 220 transmits and receives LSAs to construct the topology of the network 100. The IGP module 220 includes the LDP-IGP synchronization LSA module 285 which excludes links from the LSAs whose corresponding broadcast interfaces are not cut-edge interfaces until LDP becomes operational to all neighbors on that interface. In other words, for a broadcast interface, if there is an alternate path to the broadcast network, the LDP-IGP synchronization LSA module 285 will exclude that link corresponding to the broadcast interface from its LSAs until the LDP and IGP have synchronized (e.g., when LDP is operational with all neighbors on that broadcast interface). In one embodiment, if LDP is not fully operational for a broadcast interface, a suppress link from LSA flag is set in the local IGP interface structure 228.

Figure 5A:
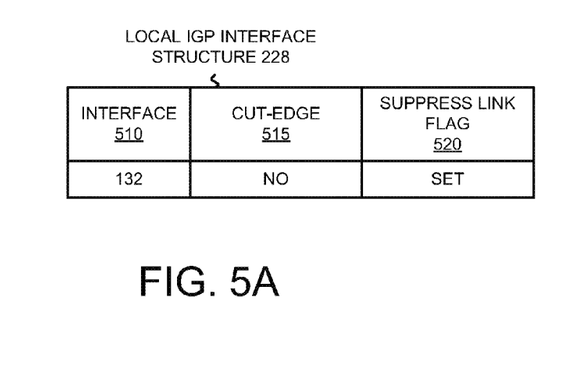
FIG. 5A illustrates an exemplary local IGP interface structure according to one embodiment of the invention.
Figure 5B:
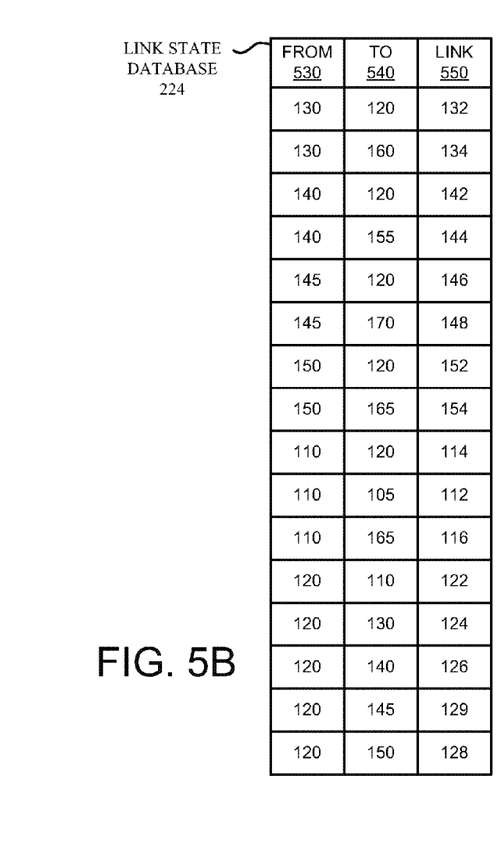
FIG. 5B illustrates an exemplary link state database according to one embodiment of the invention.

FIG. 5A illustrates an exemplary local IGP interface structure 228 according to one embodiment of the invention. As illustrated in FIG. 5A, the local IGP interface structure 228 includes the interface field 510 which identifies a local IGP interface, the cut-edge interface property field 515 which indicates whether an interface is a cut-edge interface, and the suppress link from LSA flag 520 which indicates whether the interface should be suppressed from the LSA.

The LDP module 240 negotiates labels with the other network elements in the network 100. In one embodiment, the LDP module 240 determines when LDP is fully operational for a particular broadcast interface and notifies the IGP module 220 that LDP is fully operational for that interface. The IGP module 220 may then clear the suppress link from LSA flag 520 if it has been set (if the interface was not a cut-edge interface) and advertise that link to the other network elements. The LDP module 240 is also coupled with the label manager 250, which creates and maintains the LSP structure(s) 255 which, among other things, create and manage the labels for the LSPs. The labels are programmed to one or more label forwarding information bases (LFIBs) in the data plane 260. For example, the labels stored in the LSP structure(s) 255 are programmed to one or more packet processing units of one or more line cards in the network element 130.

It should be understood that in some embodiments cut-edge interfaces are not excluded from the LSA since they are the only route to the broadcast network. Thus, since there is no other path for the traffic to flow, the traffic for any LSP will only start after LDP is operational.

Figure 3:
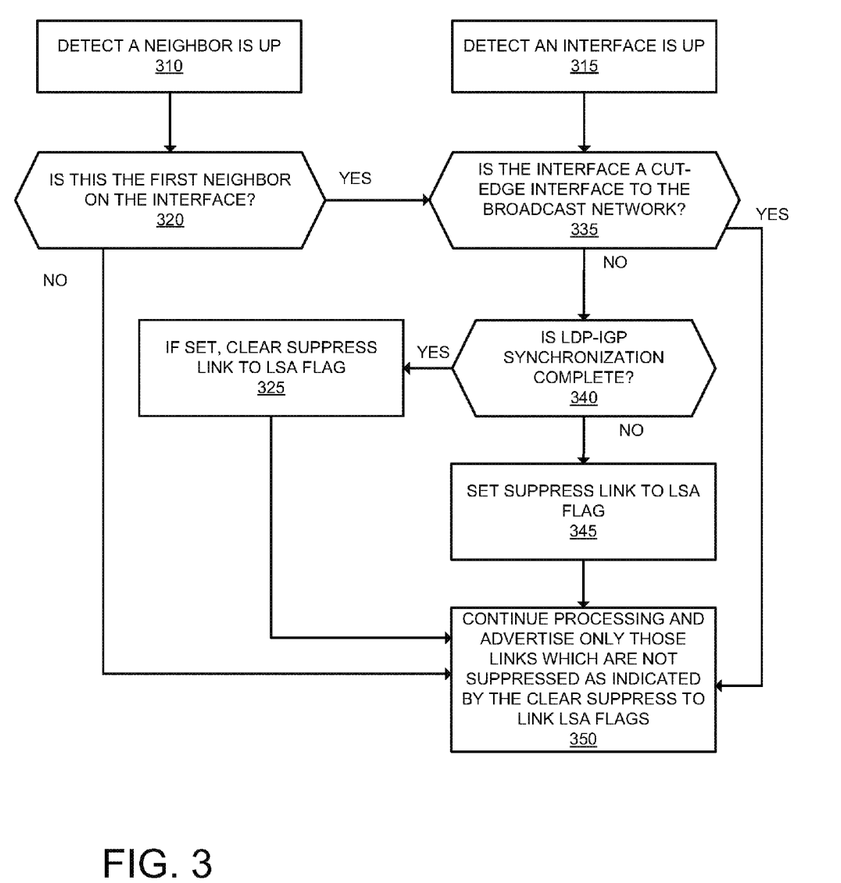
FIG. 3 is a flow diagram illustrating exemplary operations for LDP-IGP synchronization for broadcast networks according to one embodiment of the invention.

FIG. 3 is a flow diagram illustrating exemplary operations for LDP-IGP synchronization for broadcast networks according to one embodiment of the invention. The operations of FIG. 3 will be described with reference to the exemplary embodiments of FIGS. 1 and 2. However, it should be understood that the operations of FIG. 3 can be performed by embodiments of the invention other than those discussed with reference to FIGS. 1 and 2, and the embodiments discussed with reference to FIGS. 1 and 2 can perform operations different than those discussed with reference to FIG. 3.

At operation 310, a neighbor up event is detected on a broadcast interface. For example, the IGP module 220 may detect neighbor up event by receiving a hello packet message from a network element on the interface 132 which is not represented in the neighbor adjacency table 222, where the hello packet includes an identifier of the network element 132, and their LSA information is exchanged and synchronized (it should be understood that this link state advertisement information does not include the interface to the broadcast network, i.e., the broadcast interface 132). Flow moves from block 310 to block 320, where the IGP module 220 determines if the new neighbor is the first neighbor on the interface. For example, if the neighbor adjacency table 222 does not include an entry for the interface in the neighbor adjacency table 222, then the new neighbor is the first neighbor on the interface.

If the discovered neighbor is the first neighbor on the interface, then flow moves to block 335, otherwise flow moves to block 350. At block 315, an interface to the broadcast network is detected as up. For example, the interface state manager 235 detects that the interface 132 is operational. Flow moves from block 315 to block 335, where the IGP module 220 determines whether the detected interface 132 is a cut-edge interface to the broadcast pseudo-node 120. For example, the IGP module 220 accesses the local IGP interface structure 228 to check the cut-edge property of the interface 132. With reference to FIG. 1, the interface 132 is not a cut-edge interface (and the cut-edge property will indicate as such) since an alternate path exists to the broadcast pseudo-node 120. If the interface is not a cut edge, flow moves to block 340, otherwise flow moves to block 350.

At block 340, the IGP module 220 determines if LDP-IGP synchronization is complete for the interface 132. For example, the IGP module 220 accesses the local IGP interface structure 228 to check the status of the suppress link to LSA flag for the interface 132. The flag will indicate whether IGP module 220 will treat LDP and IGP as being synchronized (e.g., if the flag is set, then the IGP module 220 treats LDP and IGP as not being synchronized and if the flag is not set, then the IGP module 220 treats LDP and IGP as being synchronized). If LDP-IGP synchronization is complete, flow moves to block 325; otherwise flow moves to block 345. At block 345, since LDP-IGP synchronization is not complete and the interface is not a cut-edge interface, the suppress link to LSA flag is set. Flow moves from block 345 to block 350 were processing is continued and only those links which are not suppressed (as indicated by the suppress link LSA flag) are advertised to the broadcast network.

For example, the IGP module 220 postpones transmitting an LSA that includes the broadcast interface 132 to the broadcast pseudo-node 120 until LDP is operational on all neighbors on the interface 132. Thus, unlike the RFC "LDP IGP Synchronization" which would advertise the link with maximum cost until LDP is operational, in embodiments of the invention the link is not advertised until LDP is operational.

By not advertising the link until LDP and IGP are synchronized, the other network elements in the network 100 cannot use that link because the bidirectional connectivity check would fail until LDP and IGP are synchronized. Thus, unlike the examples previously discussed with reference to the RFC "LDP IGP Synchronization," traffic will not be redirected to sub-optimal links and traffic will not be black-holed using embodiments of the invention.

Figure 4:
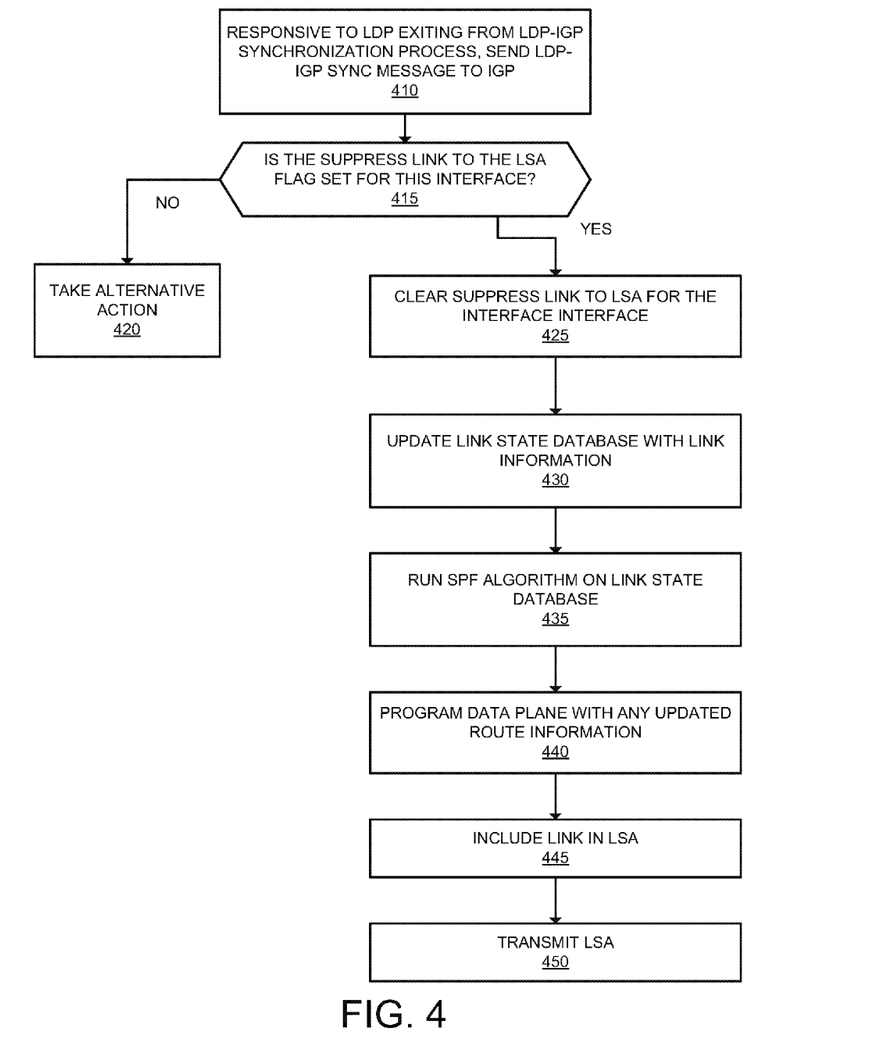
FIG. 4 is a flow diagram illustrating exemplary operations when LDP-IGP synchronization is complete according to one embodiment of the invention.

FIG. 4 is a flow diagram illustrating exemplary operations when LDP-IGP synchronization is complete according to one embodiment of the invention. The operations of FIG. 4 will be described with reference to the exemplary embodiments of FIGS. 1 and 2. However, it should be understood that the operations of FIG. 4 can be performed by embodiments of the invention other than those discussed with reference to FIGS. 1 and 2, and the embodiments discussed with reference to FIGS. 1 and 2 can perform operations different than those discussed with reference to FIG. 4.

At block 410, responsive to the LDP module 240 exiting from the LDP-IGP synchronization process for an interface, the LDP module 240 sends a LDP-IGP sync notification message to the IGP module 220. In one embodiment, the LDP-IGP synchronization process will end upon a configurable timer that allows LDP session establishment expiring. For example, based on empirical data, the network administrator may configure a timer which provides a worst case (or best guess) of the time it should take for LDP to become operational on all neighbors of the interface. The configuration value for the timer may be included in the LDP-IGP synchronization for broadcast networks configuration parameters received by the IGP module 220.

In another embodiment the network element 130 may implement the LDP End-of-LIB mechanism as specified in IETF draft "LDP End-of-LIB: draft-ietf-mpls-end-of-lib-03.txt", January 2009, to determine when the LDP-IGP synchronization process exits. For example, in LDP End-of-LIB, each LDP peer (neighbor) may signal completion of its label advertisements following session establishment. After receiving all completion signals from each LDP peer, the LDP will be operational with all neighbors and the LDP-IGP synchronization process will exit.

Flow moves from block 410 to block 415, where the IGP module 220 determines if the suppress link to the LSA flag 520 is set for the interface. If the flag is not set, then flow moves to block 420 where alternative action is taken (e.g., nothing needs to be performed). If the flag is set, then flow moves to block 425 where the IGP module 220 clears the suppress link to the LSA flag 520 for the interface. Flow moves from block 425 to block 430.

In one embodiment of the invention, an interface will be excluded from the link state database 224 if the suppress link to LSA flag is set. Thus, at block 430, the IGP module 220 updates the link state database 224 with the interface. Flow moves from block 430 to block 435, where the IGP module 220 runs a SPF algorithm on the link state database to possibly update the local IGP RIB 226 with a better route. Flow next moves to block 440, where the data plane (e.g., the FIB(s) 270) is programmed with the updated route information. Flow next moves to block 445, where the IGP module 220 includes the interface in its LSA and then flow moves to block 450 where the IGP module 220 transmits the LSA including the interface to its neighbors.

Figure 6:
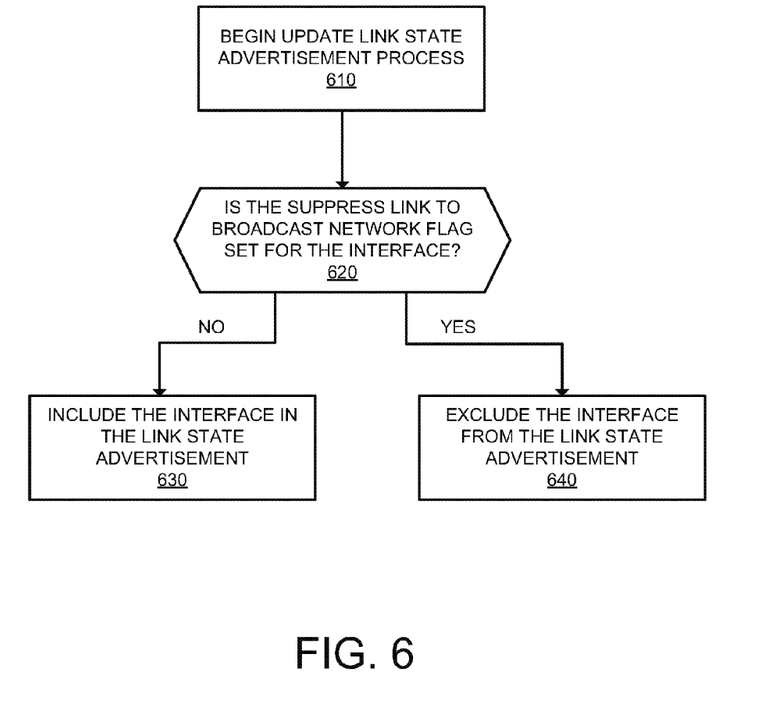
FIG. 6 is a flow diagram illustrating exemplary operations when a network element is ready to update its link-state advertisement with an interface to a broadcast network according to one embodiment of the invention.

FIG. 6 is a flow diagram illustrating exemplary operations when a network element is ready to update its link-state advertisement with an interface to a broadcast network according to one embodiment of the invention. The operations of FIG. 6 will be described with reference to the exemplary embodiments of FIG. 2. However, it should be understood that the operations of FIG. 6 can be performed by embodiments of the invention other than those discussed with reference to FIG. 2, and the embodiments discussed with reference to FIG. 2 can perform operations different than those discussed with reference to FIG. 6.

At block 610, the LDP-IGP synchronization LSA module 285 begins an update link state advertisement process. The update link state advertisement process will include an attempt to add a broadcast interface to the broadcast network (e.g. the broadcast pseudo-node 120). Flow moves from block 610 to block 620, where the LDP-IGP synchronization LSA module 285 determines whether the suppress link to LSA flag is set for the interface. If the flag is not set, then flow moves to block 630 where the interface is included in the link state advertisement. If the IGP is OSPF, the Router-LSA is updated with a Link Type 2 (link to transit network) for the subnet. If the IGP is ISIS, the Link State PDU is updated with an IS Reachability TLV (or an Extended IS Reachability TLV). If the flag is set, then flow moves to block 640 where that interface will be excluded from the link state advertisement.

Unlike the RFC 5443 "LDP IGP Synchronization," the LDP-IGP synchronization for broadcast networks mechanism described herein is not required to be implemented on each of the network elements 110 130, 140, 145, and 150 in the network 100. In some embodiments, at a minimum, only a network element that is being added to the broadcast network implements the LDP-IGP synchronization for broadcast networks mechanism described herein. Thus, the LDP-IGP synchronization for broadcast networks mechanism described herein may be introduced into a network in a gradual manner without any backward compatibility issues.

Furthermore, unlike the RFC 5443 "LDP IGP Synchronization" which requires that each network element advertising a maximum cost to the broadcast network revert back to advertising their normal cost after LDP peering between all the network elements on the broadcast network is operational (which is a non-trivial process that requires coordination between all the network elements), embodiments of the invention do not require any action to be taken by the other network elements other than the network element whose link to the broadcast network is coming up.

Figure 7:
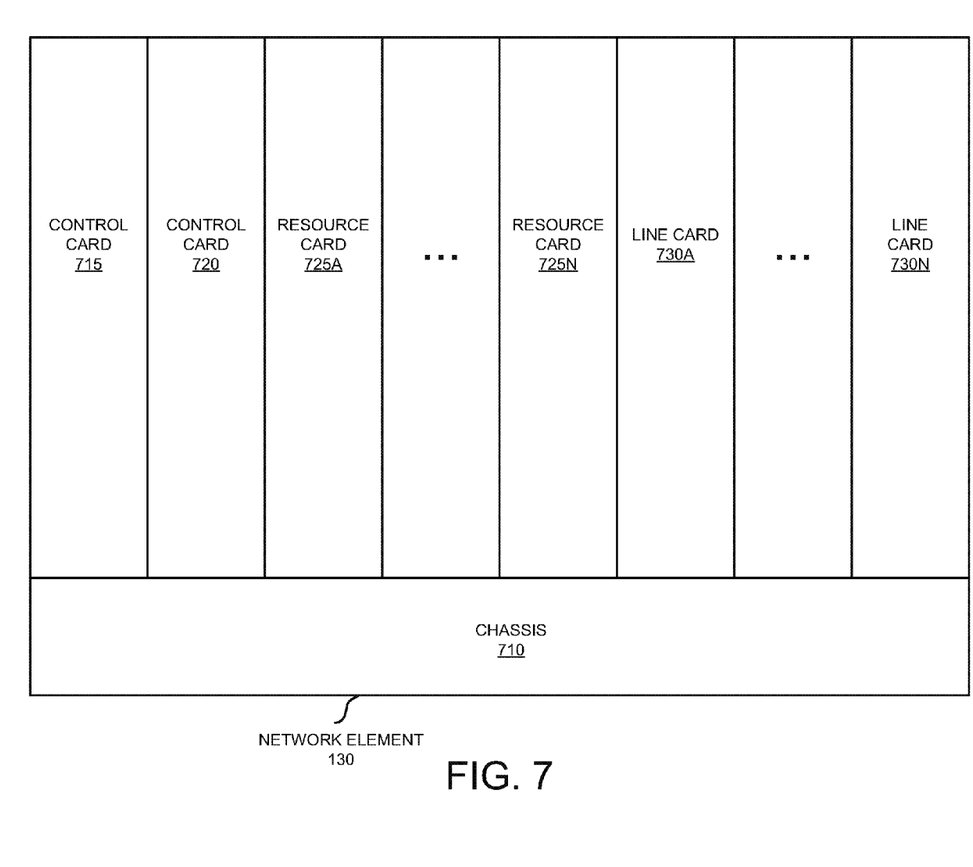
FIG. 7 illustrates an exemplary network element used in some embodiments of the invention.

FIG. 7 illustrates an exemplary network element used in some embodiments of the invention. As illustrated in FIG. 7, the network element 130 includes the control cards 715 and 720 (e.g., one control card is active the other is a backup), the resource cards 725A-725N, and the line cards 730A-730N. It should be understood that the architecture of the network element 130 illustrated in FIG. 7 is exemplary, and different combinations of cards may be used in other embodiments of the invention.

Each of the cards illustrated in FIG. 7 include one or more processors and one or more memories. For example, the line cards 730A-730B typically include one or more packet processing units to process packets including forwarding and/or switching packets at high speed, and include one or more memories to store a forwarding information base (sometimes referred to as a routing table) and a label forwarding information base. The control cards 715 and 720 also include one or more processors to perform signaling, routing (including creation of and/or management of routing tables), connection setup, session setup, etc. For example, among other things, the control card 715 execute instructions stored in memory to execute the IGP module 220 and the LDP module 240.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for label distribution protocol-interior gateway protocol (LDP-IGP) synchronization on a broadcast network performed on a network element, the method comprising:
   detecting that a first broadcast interface of the network element has become operational, wherein the first broadcast interface will be used to carry traffic through a label switched path (LSP) between the network element and the broadcast network;
   determining whether the first broadcast interface is a cut-edge interface, wherein the first broadcast interface is a cut-edge interface if there is no alternate path to reach the broadcast network; and
   in response to determining that the first broadcast interface is not a cut-edge interface:
      postponing an update to a first link state advertisement (LSA) for a period of time such that the network element expects label distribution protocol (LDP) to be operational with all LDP peers on the first broadcast interface,
      after postponing for the period of time, including the first broadcast interface in the first LSA, and
      transmitting the first LSA that includes the first broadcast interface to the broadcast network.

2. The method of claim 1, further comprising:
   detecting that a second broadcast interface of the network element has become operational, wherein the second broadcast interface will be used to carry traffic through an LSP between the network element and the broadcast network;
   determining whether the second broadcast interface is a cut-edge interface;
   in response to determining that the second broadcast interface is a cut-edge interface:
      including the second broadcast interface in a second LSA, and
      transmitting the second LSA that includes the second broadcast interface to the broadcast network.

3. The method of claim 1, further comprising:
   setting a suppress link to LSA flag for the first broadcast interface until after postponing for the period of time; and
   wherein postponing of including the first broadcast interface in the LSA includes checking the suppress link to LSA flag when updating a LSA to determine whether to add the first broadcast interface to the updated LSA.

4. The method of claim 1, further comprising:
   postponing updating a link state database (LSDB) of the network element with the first broadcast interface until after postponing for the period of time.

5. The method of claim 1, wherein the period of time is configurable.

6. The method of claim 1, wherein the network element is implementing Open Shortest Path First (OSPF), and wherein postponing including the first broadcast interface in the first LSA includes postponing updating a router-LSA with a Link Type 2 for the broadcast network until after postponing for the period of time.

7. The method of claim 1 wherein the network element is implementing intermediate system to intermediate system (IS-IS), and wherein postponing including the first broadcast interface in the first LSA includes postponing updating a Link State PDU with an IS Reachability TLV for the broadcast network until after postponing for the period of time.

8. The method of claim 1, wherein the traffic is Virtual Private Network (VPN) traffic.

9. A network element to perform label distribution protocol-interior gateway protocol (LDP-IGP) synchronization on a broadcast network, the network element comprising:
   one or more processors to execute instructions; and
   one or more memories coupled with the processor, the one or more memories having instructions that, when executed cause the one or more processors to perform operations comprising:
      detecting that a first broadcast interface of the network element has become operational, wherein the first broadcast interface will be used to carry traffic through a label switched path (LSP) between the network element and the broadcast network,
      determining whether the first broadcast interface is a cut-edge interface, wherein the first broadcast interface is a cut-edge interface if there is no alternate path to reach the broadcast network, and
      in response to determining that the first broadcast interface is not a cut-edge interface:
         postponing an update to a first link state advertisement (LSA) for a period of time such that the network element expects label distribution protocol (LDP) to be operational with all LDP peers on the first broadcast interface,
         after postponing for the period of time, including the first broadcast interface in the first LSA, and
         transmitting the first LSA that includes the first broadcast interface to the broadcast network.

10. The network element of claim 9, the operations further comprising:
    detecting that a second broadcast interface of the network element has become operational, wherein the second broadcast interface will be used to carry traffic through an LSP between the network element and the broadcast network;
    determining whether the second broadcast interface is a cut-edge interface; and
    in response to determining that the second broadcast interface is a cut-edge interface:
       including the second broadcast interface in a second LSA, and
       transmitting the second LSA that includes the second broadcast interface to the broadcast network.

11. The network element of claim 9, the operations further comprising:
    setting a suppress link to LSA flag for the first broadcast interface until after postponing for the period of time; and
    wherein postponing of including the first broadcast interface in the LSA includes checking the suppress link to LSA flag when updating a LSA to determine whether to add the first broadcast interface to the updated LSA.

12. The network element of claim 9, the operations further comprising:

postponing updating a link state database (LSDB) of the network element with the first broadcast interface until after postponing for the period of time.

13. The network element of claim 9, wherein the period of time is configurable.

14. The network element of claim 9, wherein the network element is implementing Open Shortest Path First (OSPF), and wherein postponing including the first broadcast interface in the first LSA includes postponing updating a router-LSA with a Link Type 2 for the broadcast network until after postponing for the period of time.

15. The network element of claim 9 wherein the network element is implementing intermediate system to intermediate system (IS-IS), and wherein postponing including the first broadcast interface in the first LSA includes postponing updating a Link State PDU with an IS Reachability TLV for the broadcast network until after postponing for the period of time.

16. The network element of claim 9, wherein the traffic is Virtual Private Network (VPN) traffic.

17. A network element to perform label distribution protocol-interior gateway protocol (LDP-IGP) synchronization on a broadcast network, the network element comprising:

an interior gateway protocol (IGP) module configured to determine whether a first broadcast interface is a cut-edge interface, wherein the first broadcast interface is a cut-edge interface if there is no alternate path to reach the broadcast network, and in response to determining that the first broadcast interface is not a cut-edge interface, postponing an update to a first link state advertisement (LSA) for a period of time such that the network element expects label distribution protocol (LDP) to be operational with all LDP peers on the first broadcast interface, after postponing for the period of time, including the first broadcast interface in the first LSA, and transmitting the first LSA that includes the first broadcast interface to the broadcast network; and a label distribution protocol (LDP) module to exchange label bindings with LDP peers of the network element for the first broadcast interface.

18. The network element of claim 17, wherein the IGP module is further configured to determine whether a second broadcast interface is a cut-edge interface, and in response to determining that the second broadcast interface is a cut-edge interface, including the second broadcast interface in a second LSA, and transmitting the second LSA that includes the second broadcast interface to the broadcast network.

19. The network element of claim 17, wherein the IGP module is to determine whether the first broadcast interface of the network element is a cut-edge interface when executing a shortest path first (SPF) algorithm.

20. The network element of claim 17, wherein the IGP module is to add the first broadcast interface to the first LSA by updating a router-LSA with a Link Type 2 for the broadcast network.

* * * * *

UNITED STATES PATENT AND TRADEMARK OFFICE
CERTIFICATE OF CORRECTION

PATENT NO. : 9,094,340 B2  
APPLICATION NO. : 14/171332  
DATED : July 28, 2015  
INVENTOR(S) : Kini et al.

It is certified that error appears in the above-identified patent and that said Letters Patent is hereby corrected as shown below:

Title Page

On Page 2, in Item (56), under "OTHER PUBLICATIONS", in Column 2, Line 34, delete ""Mulitcast" and insert -- "Multicast --, therefor.

Specification

In Column 1, Line 8, delete "which" and insert -- now Pat. No. 8,681,823, which --, therefor.

In Column 1, Line 10, delete "which" and insert -- now Pat. No. 8,102,883, which --, therefor.

In Column 4, Line 32, delete "element will advertise 152" and insert -- element 150 --, therefor.

Signed and Sealed this  
Twelfth Day of January, 2016

Michelle K. Lee  
*Director of the United States Patent and Trademark Office*